Jan. 10, 1939.  S. C. PLATT  2,143,385
CAMERA
Filed Aug. 12, 1936    2 Sheets-Sheet 1
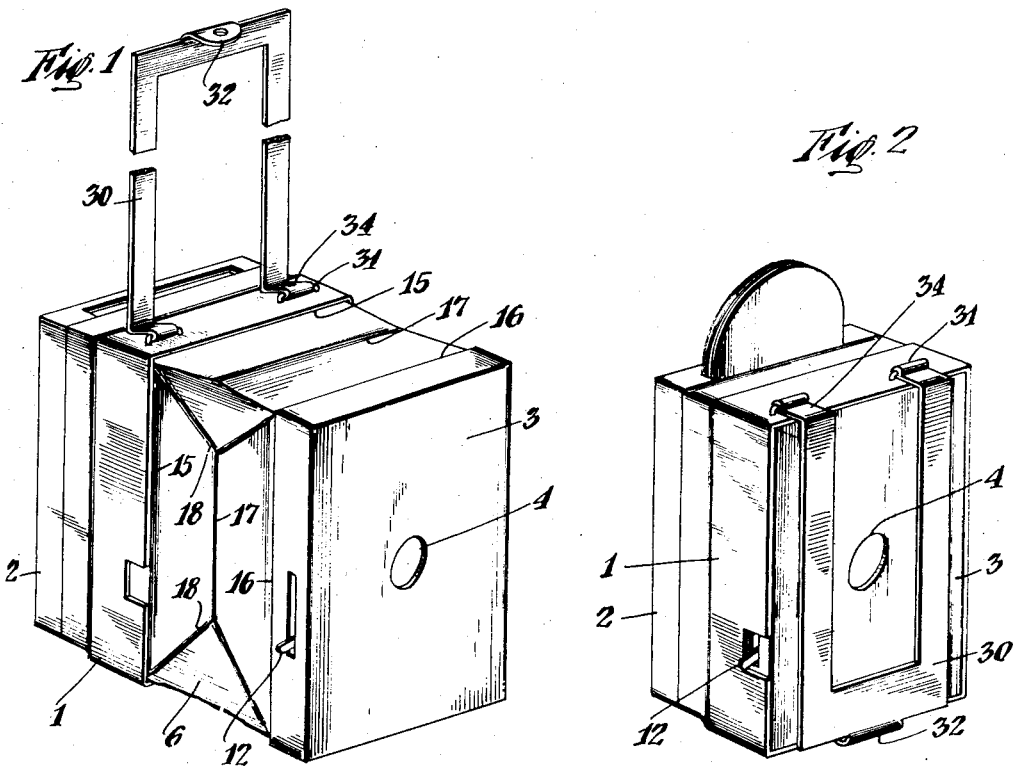
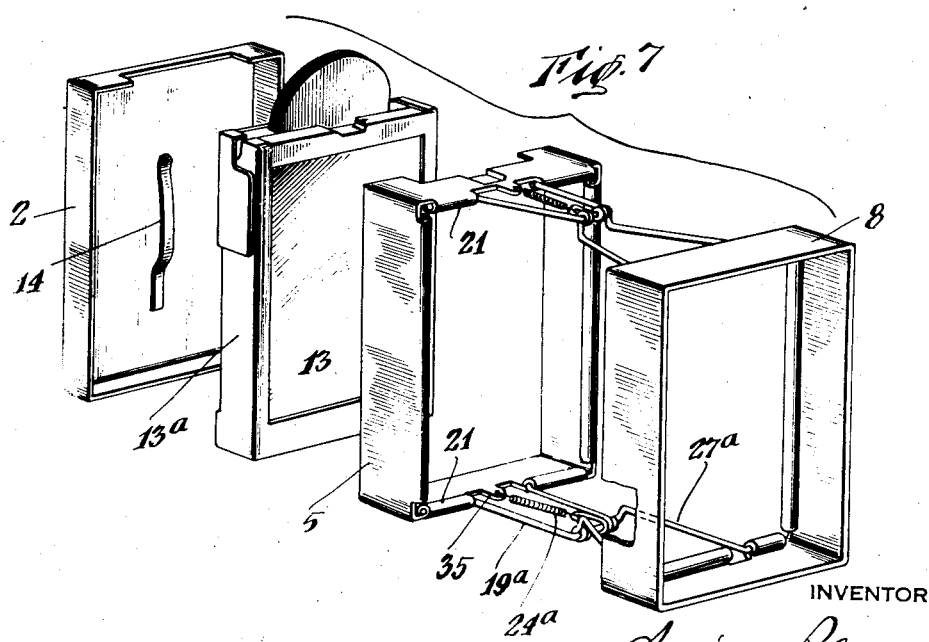
INVENTOR
Samuel C. Platt Jan. 10, 1939.  S. C. PLATT  2,143,385
CAMERA
Filed Aug. 12, 1936   2 Sheets-Sheet 2
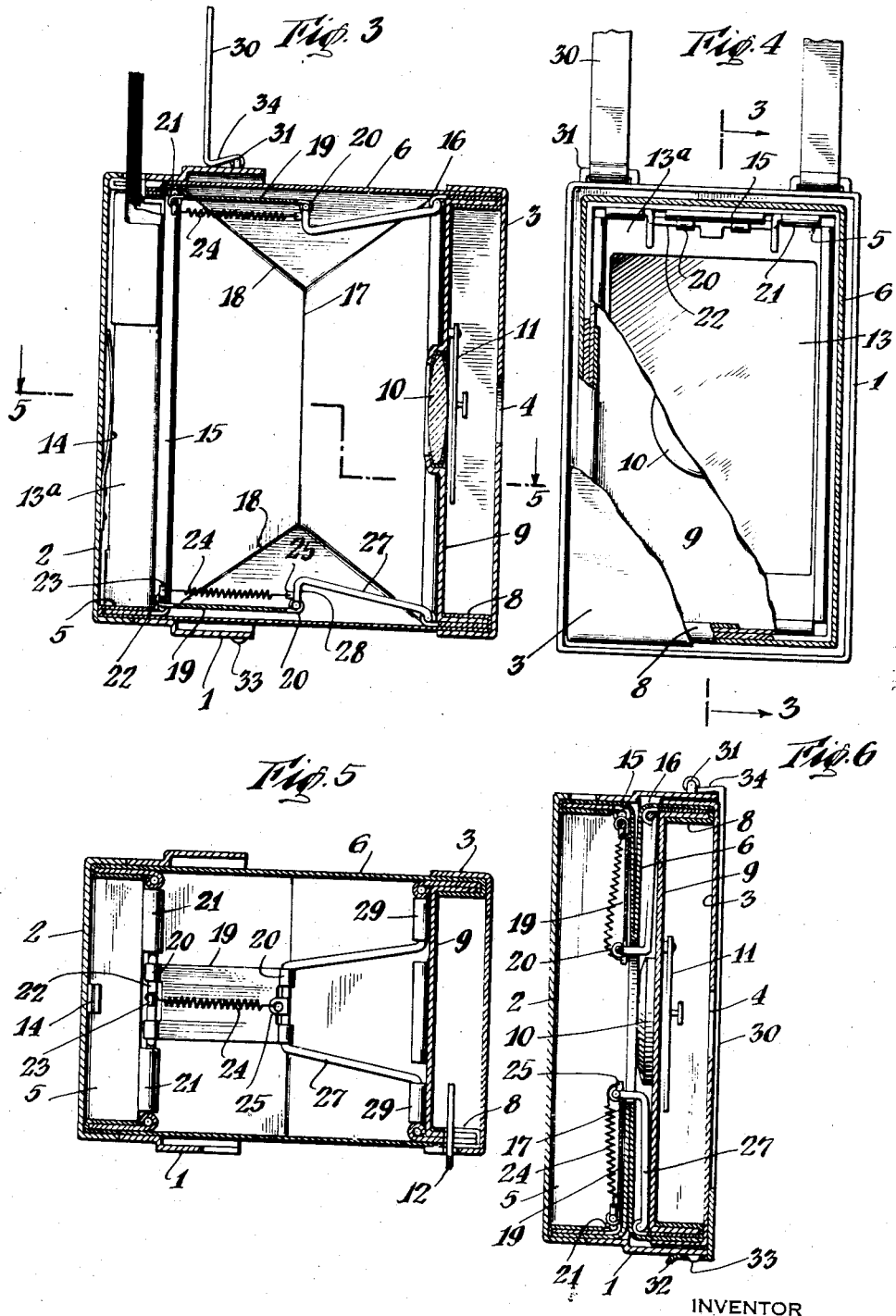
INVENTOR
Samuel C. Platt Patented Jan. 10, 1939

2,143,385

UNITED STATES PATENT OFFICE

2,143,385

CAMERA

Samuel C. Platt, New York, N. Y., assignor of one-fourth to Albert Lavenburg, New York, N. Y., and one-fourth to Edward Petigor, New York, N. Y.

Application August 12, 1936, Serial No. 95,496

8 Claims. (Cl. 95—39)

This invention relates to cameras and more particularly to folding cameras.

Primary objects of the invention are the provision of a folding camera having improved characteristics and provision of ultra compactness of the folded camera.

More specifically, objects of the invention are the provision of improved bellows in a folding camera; provision of improved means for supporting the front piece from the box or body of the camera; to increase the rigidity of the extended front piece over prior art constructions; to assure of absolute parallelism between the extended front piece and the body portion; to provide a foldable structure which automatically opens; to provide means for holding the camera in closed position and preventing the foldable structure from opening automatically until said means is released; to provide a camera which is simple, rugged but compact, durable and reliable; and to obtain a structure economical of manufacture and neat in appearance.

The invention accordingly comprises the features of construction, combination of elements, mode of operation, and arrangement of parts which are exemplified in the drawings as well as such which are mentioned above or which may appear hereinafter in the following descriptive disclosure wherein further objects and advantages of the invention will appear, and the scope of the invention of which will be set forth in the appended claims as construed in the light of the prior art.

Referring to the accompanying drawings in which like numerals of reference indicate similar parts throughout the several views;

Figure 1 is an isometric view of my improved camera distended for use;

Figure 2 is an isometric view of the same when closed or collapsed;

Figure 3 is a sectional view upon a central vertical plane normal to the lens, as upon line 3—3 of Figure 4 showing the camera distended for use;

Figure 4 is a front view of the camera distended with parts broken away to disclose structure therebehind;

Figure 5 is a horizontal sectional view of the distended camera as upon line 5—5 of Figure 3;

Figure 6 is a vertical central sectional view of the camera similar to the showing of Fig. 3 but with the camera in collapsed position; and Figure 7 is an isometric view of internal parts and back cover and showing a modified structure of distending means.

In the specific embodiment of the invention illustrated in said drawings, the reference numeral 1 indicates the body portion or shell of my improved camera. This body portion is shown as a rectangular frame of sheet metal which extends in a forwardly and rearwardly direction, there being a rear closure cap 2 for the rear area of the frame and a front cover 3 for the front area of the frame. Both the closure cap 2 and front cover 3 have peripheral side flanges as well as each an end face. The front cover 3 has a central aperture 4 through which the picture will be taken. The rear closure cap 2 remains stationary upon the rear of the body portion except as its removal is required for loading the camera with new films or the like.

The front cover 3 is movably mounted so as to move forwardly from the body portion to distend the camera when it is desired to take a picture. When the camera is folded, for instance for carrying around in the pocket, the front cover is pushed back or retracted, and the parts are arranged and proportioned so the flange of the front cover telescopes within the body portion. It will be noted that the body portion is stepped so as to provide a front peripheral margin which will telescopically receive the front cover and provides a rear peripheral margin portion which is permanently secured to an inner frame 5. The bellows 6 extends from this inner frame forwardly to within said front cover 3 and is secured therein upon a second or forward frame 8 which in turn is permanently carried within the front cover. For purposes of obtaining an economical light proof inclosure, the material forming the bellows preferably extends over the peripheral walls of both the said frames and at the rear of the camera this material is bent inwardly of the rear frame to cover the inner wall thereof. At the front of the camera the material of the bellows is likewise turned inwardly, and covers the surface of the flange of an inner cover 9 permanently mounted within the front frame. This inner cover has a peripheral flange which extends forwardly and thus the end or main wall of this cover is spaced the depth of the flange from the front wall of the front cover, and parallel thereto. This inner cover has a central aperture and carries the usual lens 10 and shutter 11 the actuation of which is controlled as usual by a toggle lever 12 projecting through the side flanges of the covers and front frame to be available for manipulation by the user.

When the camera is used for taking a picture the movable front part is distended, and by manipulating the toggle lever 12 the shutter is opened as usual and the light is permitted to pass through the lens to the interior of the camera within the area enclosed by the bellows. The light functions upon the film or over sensitized surface 13, which in the present instance is shown contained in the commercial film pack 13a held within the rear frame 15 immediately forward of the rear cap 2. On the inside of the end wall of the rear cap is shown a leaf spring 14 for exerting resilient pressure upon the film pack to hold it in place. The end wall of the said rear cap substantially engages the rearwardly projecting rim of frame 5, and the flange of said rear cap overlies the peripheral part of the said frame and abuts at its forward edge against the rear edge of the body portion.

A feature of the present invention is in the provision of a bellows which will have minimum creases and especially a predetermined crease midway of the foldable length of the bellows to make it impossible to collapse except along that definite predetermined crease. The bellows is arranged with a peripheral crease at the forward edge of the rear frame 5, as at 15, and also a parallel peripheral crease, as at 16, at the rear edge of the forward frame 8. This part of the bellows between creases 15 and 16 may be termed the foldable part, and is provided with only a single peripheral crease 17 intermediate of the frame creases 15 and 16 (and such diagonal creases 18, 18 as may be required) so that bellows will have only one inward deflection at its middle when folded. The length of the bellows from either fold 15 or 16 to the middle of fold 17 may well be proportioned to be one-half of the width of the bellows. When the bellows are folded, inwardly deflected crease edges 17 will define a rectangular opening at the middle of the camera in front of but of considerably less size than the film. This structure reduces the number of folds and therefore reduces the bulk of the folded bellows in a direction normal to the lens so that the camera may be very flat when folded. Likewise the number of creases are decreased over the present day practice and thus reduces the liability of cracks or crevices forming in use in the bellows to admit light, especially since it does not have to be so severely squeezed to obtain compactness.

A further feature of the invention is a means by which the front cover or forward end of the camera is distended and maintained distended in a stable condition with respect to the body portion, and provision of such means to be positioned within the bellows. The means illustrated in Figures 3 to 6 inclusive provides a folding arm structure within the bellows adjacent two opposed walls, and preferably, as shown, adjacent the top and bottom walls thereof. Description of one of these folding arm structures will suffice for both.

Preferably a plate 19 of suitable width to prevent wabbling is provided with curled hinge ends 20, the preferred length of the plate being substantially equal to the distance from the fold 15 of the bellows to the middle fold 17 thereof. The forward edge of the rear frame 5 is curled, both to prevent cutting the bellows and to provide hinge members 21 to cooperate with hinge members 20 of the plate to receive the hinge pin 22. This hinge pin is shown offset inwardly of the camera, is non-rotatable in the frame hinge members 21, and provides at its middle a lug 23 projecting inwardly of the camera for securing one end of a spring 24 thereto. The forward end of this spring is attached to another lug 25 projecting inwardly of the camera from the middle part of a hinge portion 26 of the forward hinged member which is here shown made of rod or wire providing a pair of leg portions 27 connected, with an offset 28, to the said hinge portion 26 and shown with the forward ends bent laterally to enter curled hinged portions 29 at the rear edge of the forward frame 8. The action of the spring tends to unfold the arms from the position of Fig. 6 to the extended position of Figs. 3 and 5. The user may overcome the spring action by pushing the front part of the camera toward the rear and thus fold the arm structure as in Fig. 6 and telescope the front cover into the body portion. The foldable toggle structure, when extended, lies close to the extended bellows wall so as not to interfere with the light from lens to film. When the camera is folded, the toggle structure serves to guide the front frame and covers, assists in requiring the bellows to fold on its predetermined crease and finally, serves to keep the folded part of the bellows from engaging and scratching the face of the film. This enables the film to occupy a considerably closer position to the folded bellows than heretofore possible.

Suitable means is provided for holding the camera in its retracted position. The means here shown utilizes the picture finder for this double function. It will be noted the picture finder comprises a substantially U-shaped member 30 the ends of the legs of which are hinged, as at 31, to the body portion so that the finder may swing to upright position over the body portion to a plane parallel to the front face of the camera or may swing downwardly, when the camera is retracted, with the legs of this U-shaped member then extending downwardly in front of the front face of the camera. A spring tab 32 on the cross-portion of the U-shaped member will then underlie the bottom of the body portion and may be caused to snap over a stud or button 33 as shown in Fig. 6. The legs of the U-shaped member are preferably offset at their hinged ends, as at 34, both to render the finder stable when swung to upright position and also to provide a proper spacing for enabling the legs to swing down in front of the camera.

It is not to be understood that the foldable or toggle structure requires as matter of necessity that one of its parts be a plate. It may as well be rod or wire construction, and exemplification of such an embodiment is shown in connection with Fig. 7. The structure there shown provides wire arms 19a and 27a with meeting portions hinged together and extreme ends hinged to the frames 5 and 8 respectively. A spring 24a is secured to a projecting part of an offset portion of one arm and to a lug 35 formed at the middle of the flange edge of frame 5. This spring, as in previously described construction tends to automatically straighten out the foldable structure and distend the forward part of the camera. In both structures, it should be emphasized that the release of the range finder from in front of the front cover, permits the camera to automatically distend into picture-taking position. This action is obtained by the tension of the springs of the toggle structure and that tension and structure thereupon holds the front cover and associated parts rigid as well as distended and parallel to the film for the picture-taking purposes.

I claim:

1. A camera having a body portion with means for mounting a sensitized element next the rear thereof, a movable forward portion having an aperture therein through which to take the picture, a frame fixed in said body portion and another frame fixed in respect to said movable portion, the edges of said frames toward each other being curled, and a bellows foldable next said curled edges upon retraction of the movable portion of the camera toward the body portion.

2. A camera having a body portion with means for mounting a sensitized element next the rear thereof, a movable forward portion having an aperture therein through which to take the picture, a bellows connecting the body portion and movable portion, a foldable structure for supporting the movable portion of the camera with respect to the body portion, said foldable structure having toggle arms which will swing into the interior of the camera in folded position, and a constantly tensioned spring operatively connected to one of said toggle arms exerting its force both to distend said movable portion from the body portion and maintain it distended.

3. A camera having a body portion with means for mounting a sensitized element next the rear thereof, a movable forward portion having an aperture therein through which to take the picture, and a bellows connecting the body portion and movable portion, and a foldable structure for supporting the movable portion of the camera with respect to the body portion, said foldable structure having toggle arms which will swing into the interior of the camera in folded position, and said foldable structure having a spring constantly tending to straighten said structure and distend the movable part of the camera.

4. A camera having a body portion with means for mounting a sensitized element next the rear thereof, a movable forward portion having an aperture therein through which to take the picture, and a bellows connecting the body portion and movable portion, and a foldable structure for supporting the movable portion of the camera with respect to the body portion, said foldable structure having toggle arms which will swing into the interior of the camera in folded position, and said foldable structure having a spring constantly tending to straighten said structure and distend the movable part of the camera, said foldable structure supporting the movable portion and for at all times preventing said bellows from contacting with said film.

5. A camera having a body portion with means for mounting a sensitized element next the rear thereof, a movable forward portion having an aperture therein through which to take the picture, and a bellows connecting the body portion and movable portion, and a foldable structure for supporting the movable portion of the camera with respect to the body portion, said foldable structure having toggle arms which will swing into the interior of the camera in folded position, said foldable structure having means for automatically distending said movable portion away from said body portion, and means including a member pivoted to one of said portions adapted to be swung across the other of said portions when said portions are in a closed-together position, said member when swung free of said other of said portions holding said portions in a closed-together position and for permitting said foldable structure to automatically separate said portions.

6. A camera having a body portion with means for mounting a sensitized element next the rear thereof, a movable forward portion having an aperture therein through which to take the picture, a frame fixed in said body portion and another frame fixed in respect to said movable portion, the edges of said frames toward each other being curled, toggle arms extending between a pair of opposed curled edges of the respective portions and hinged within the said curled edges, and a bellows folded next said curled edges upon retraction of the movable portion of the camera toward the body portion.

7. A camera having a body portion and a movable portion, means for automatically impelling the movable portion to distended position from the body portion, and a member pivoted through the body portion extendable across the face of the movable portion when the movable portion is in retracted position notwithstanding the force of the automatic impelling means.

8. A camera having a body portion and a movable portion, means for automatically impelling the movable portion to distended position from the body portion, and a member pivoted through the body portion extendable across the face of the movable portion when the movable portion is in retracted position notwithstanding the force of the automatic impelling means, and catch means at the end of said pivoted member at the far end from the pivoting thereof for retaining the member in its position across the face of the movable portion.

SAM'L C. PLATT.